Oct. 12, 1926.
J. CREECH
ANIMAL TRAP
Filed May 1, 1926
1,602,652
2 Sheets-Sheet 1
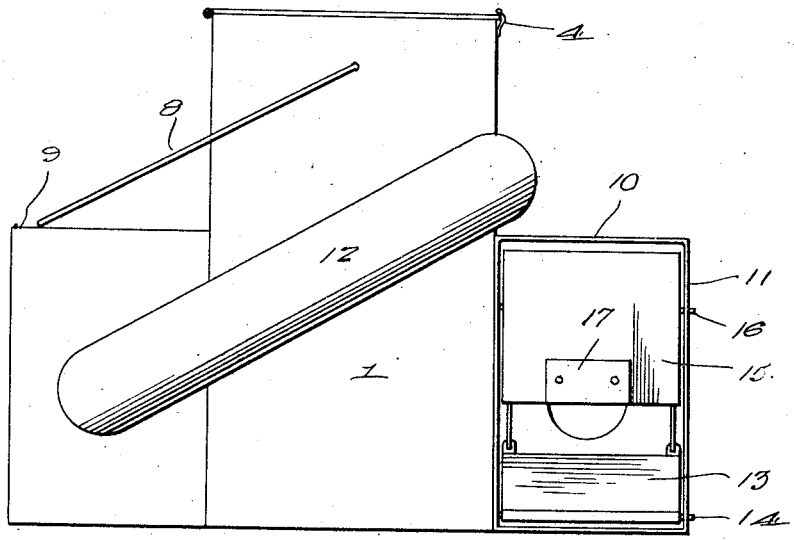
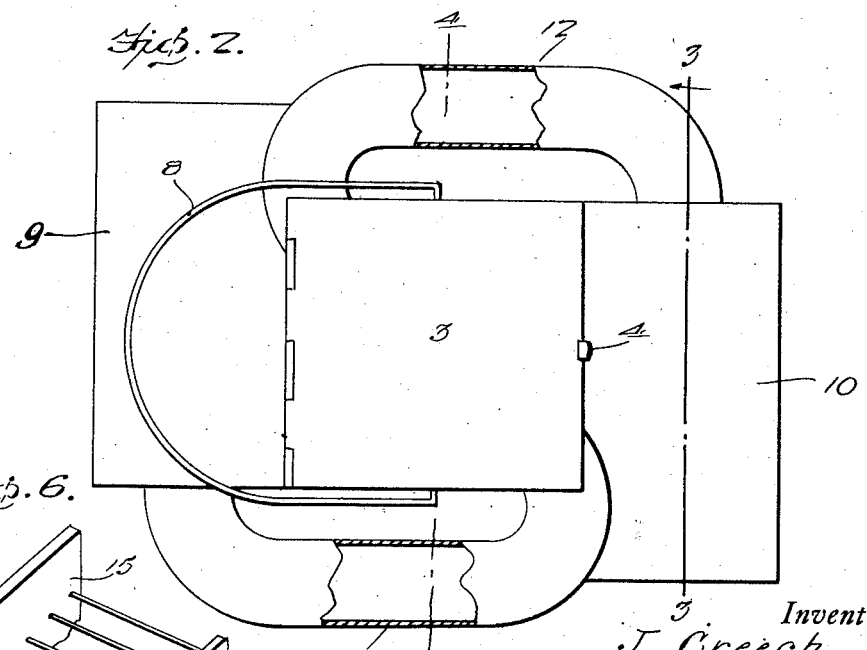
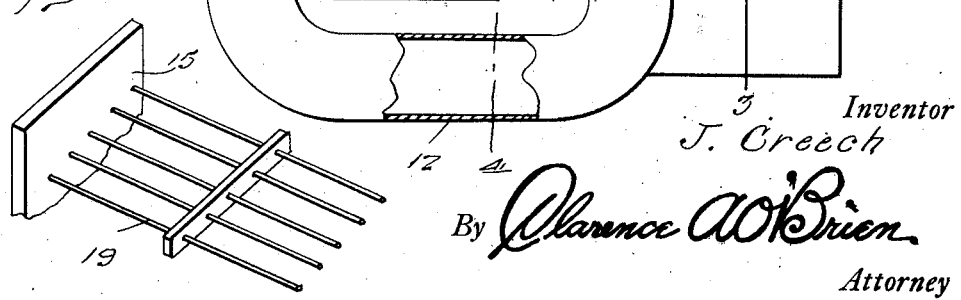
Inventor
J. Creech
By Clarence A. O'Brien
Attorney

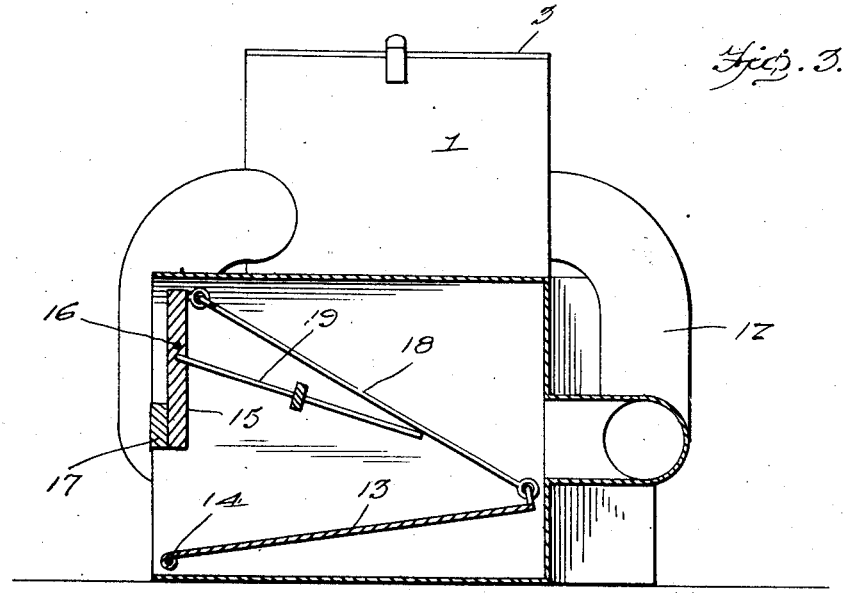
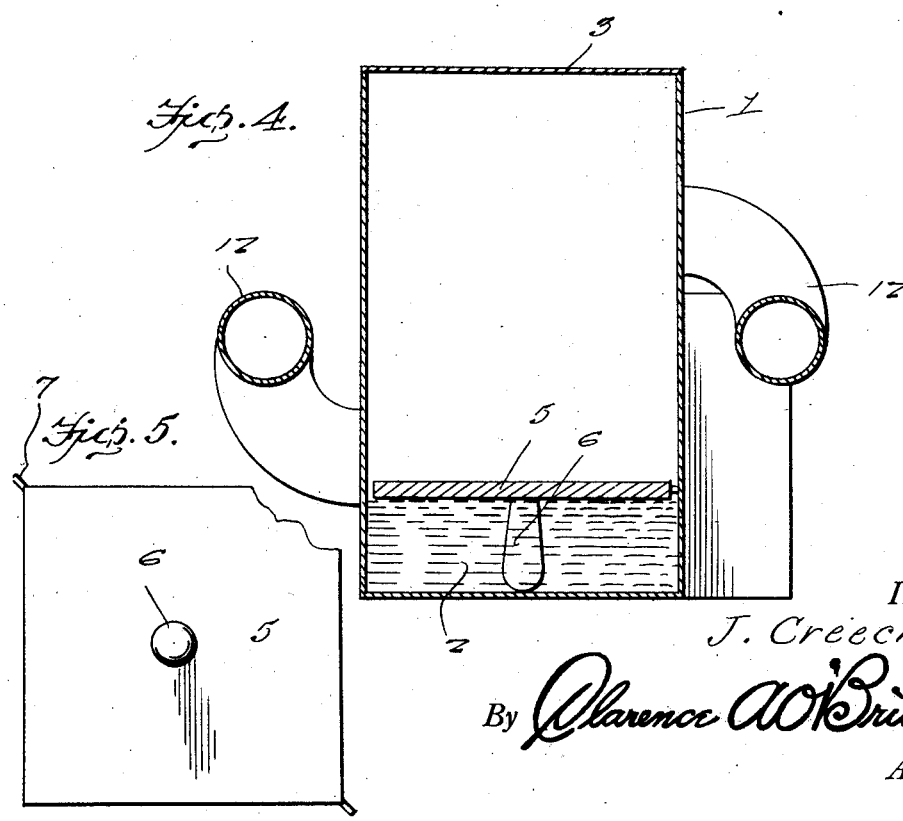

Patented Oct. 12, 1926.

1,602,652

UNITED STATES PATENT OFFICE.

JAMES CREECH, OF SAUGUS, CALIFORNIA.

ANIMAL TRAP.

Application filed May 1, 1926. Serial No. 105,987.

My present invention pertains to animal traps, and contemplates the provision of a simple, inexpensive and reliable trap for rats and other rodents; the trap in one size being adapted for mice and in another size for rats and, it being within the purview of my invention to so proportion the parts in a single trap that the trap may be used to advantage for the catching of both mice and rats.

With the foregoing in mind, the invention in all of its details will be fully understood from the following description and claims when the same are read in connection with the drawings, accompanying and forming part of this specification, in which:—

Figure 1 is an elevation of the trap constituting the best practical embodiment of my invention of which I am cognizant.

Figure 2 is a top plan view of the same with portions in section.

Figure 3 is a vertical section taken in the plane indicated by the line 3—3 of Figure 2, looking toward the left.

Figure 4 is a vertical central section taken in the plane indicated by the line 4—4 of Figure 2, with the bail omitted.

Figure 5 is an inverted plan view of the platform which may be used to support bait with a view to attracting rodents to the retention chamber of the trap.

Figure 6 is a detail perspective of the non-return element of the trap, with a portion thereof broken away.

Similar numerals of reference designate corresponding parts in all of the views of the drawings.

It is within the purview of my invention to make the major portion of my novel trap of sheet metal or of any other material or materials compatible with the purpose of the trap.

Among other elements the trap comprises a retention chamber 1 designed to contain water, designated by 2, in its lower portion and provided with a hinged cover 3, adapted to be normally maintained in a closed position through the medium of a fastener 4 which may be of any appropriate type. While I describe the cover 3 as hinged it is obvious that the said cover 3 may be adapted in any approved manner to be opened when it is necessary to remove the carcasses of rats or mice therefrom.

The chamber 1 is preferably, though not necessarily, of rectangular form in horizontal section, and in its lower portion is arranged a platfom 5 which when deemed expedient may be employed to support bait, the purpose of which is to attract rodents to the chamber 1 and to a position upon the platform 5. The said platform 5 is provided with a central pendent weight 6, and is pivotally mounted at opposite points as designated by 7, and hence when a rat or mouse leaps upon the platform 5 to get at the bait, the platform will sag or swing downwardly under the weight of the rat or mouse and hence the rat or mouse will be immersed in the water 2 and ultimately drowned.

The chamber portion 1 of the trap may be and preferably is equipped with a bail 8.

Disposed at opposite sides of the chamber portion 1 of the trap are reversely arranged entrance portions 9 and 10, each of the said entrance portions including a casing 11, open at one end and closed at its opposite end, Figure 3, and having its closed end connected through the medium of a conduit 12 with the interior of the chamber 1. In each chamber or casing 11 is arranged a swingable platform 13, pivoted at 14 and designed to normally rest in the position shown in Figure 3. Also arranged in each casing 11 and at the entrance end thereof is a lever member 15, pivoted at 16 and equipped at 17 with a weight, the gravitational action of which tends to yieldingly retain the platform 13 in the Figure 3 position. Links 18 are interposed between and pivotally connected to the platform 13 and the lever member 15; it will also be noted that a non-return element 19 is fixed to the lever member 15 and normally rests at an approximately acute angle to the links 18. By virtue of this arrangement it will be noted that when a rat or mouse enters the trap and passes upon either of the platforms 13, the platform will be depressed when the rat or mouse arrives at a point near the inner end of the platform 13, and hence the lever member 15 will be swung and the non-return element 19 will be caused to assume a pendent position, in which position said element 19 will preclude retrograde movement or escape of the rat or mouse. At this time the rat or mouse attracted by the scent of the bait on the platform 5 in the chamber 1 will pass through the conduit or passage 12 and when the rat or mouse discerns the bait upon the platform 5 the rat or mouse will jump to said platform 5 whereupon the operation before described will ensue. Manifestly when a rat or mouse passes as stated from the platform 13 to the end of the passage or conduit 12, the gravitational action of the lower arm of the lever member 15 will operate to promptly return the platform 13 and the non-return element 19 to the normal positions shown in Figure 3 so that the trap will again be in readiness to catch a rat or mouse.

It will be apparent from the foregoing that my novel trap may be made in different sizes for the catching of mice and rats, respectively, and I would also have it understood that it is within the purview of my invention to make one of the entrance portions of the trap of a size appropriate for mice, and the other entrance portion of a larger size appropriate for rats. Again, it is within the purview of my invention to make the trap of a size suited to the catching of animals other than mice and rats.

When equipped with the mentioned bail 8, my novel trap may obviously be moved with facility from one point to another and may be conveniently carried in the hands.

It will be appreciated from the foregoing that my novel rat trap is, at once, simple and inexpensive in construction and efficient in operation, and that the trap in general is well adapted to withstand the usage to which devices of corresponding character are ordinarily subjected.

I have entered into a detailed description of the construction and relative arrangement of parts embraced in the present and preferred embodiment of my invention in order to impart a full, clear and exact understanding of the said embodiment. I do not desire, however, to be understood as limiting myself to the precise construction and arrangement disclosed, my invention being defined by my appended claims within the scope of which modifications may be made without departure from my invention. For instance, while the reverse arrangement of the entrances of the trap is preferable in order that mice or rats may simultaneously enter the trap without being seen by each other, yet when deemed expedient the entrances may be arranged at the same side of the trap without departure from my invention. It will be noted, however, that the reverse arrangement of the entrances is desirable not only for the reason before stated, but also because it renders it feasible to locate the discharge or exit orifices of the conduits or passages 12 in about the same horizontal plane as will be understood from Figure 3.

Having described my invention, what I claim and desire to secure by Letters Patent is:—

1. A rat trap comprising a retention chamber, an entrance portion located alongside said retention chamber and open at one end, a platform located in the entrance portion and hingedly mounted adjacent the bottom and open ends thereof, a lever member pivoted in the upper portion of the open end of the entrance and having its lower arm weighted, a connection between the inner end of the platform and the upper arm of said lever member, and a non-return member carried by and movable with the lower arm of the lever member, and a conduit communicating with the entrance portion at the closed end thereof and having its receiving end located above the inner end of the platform and also having its exit end in communication with the interior of the retention chamber.

2. A trap comprising a retention chamber, entrance portions located at opposite sides of the retention chamber and having casings closed at one end and open at their opposite ends, a conduit leading from the closed ends of the casings of the entrance portions to the retention chamber, vertically swingable platforms arranged in the casings at the entrance portions and hinged near the bottom and open ends of said casings, lever members mounted near the open ends of the casings of the entrance portions and having weighted arms, non-return members fixed with respect to the weighted arms of the lever members, and link means interposed between and connected to the vertically swingable platforms and the upper arms of the lever members.

3. A trap comprising a retention chamber, entrance portions arranged at opposite sides of said chamber and having reversely arranged entrances, conduits interposed between and connecting the opposite ends of the entrance portions and the retention chamber, vertically swingable platforms in the entrance portions, vertically swingable lever members in said portions and having weighted arms, non-return elements fixed to the weighted arms of the lever members, and link connections between the platforms and the upper arms of the lever members.

4. A trap comprising a retention chamber, an entrance portion, a conduit intermediate of the entrance portion to the retention chamber, vertically movable means in the entrance portion and depressible by the weight of an entering animal, and non-return means operable by depression of said depressible means to prevent retrograde movement of an animal from the entrance portion.

In testimony whereof I affix my signature.

JAMES CREECH.